United States Patent
Pan et al.

(10) Patent No.: US 12,125,271 B2
(45) Date of Patent: Oct. 22, 2024

(54) IMAGE PARAGRAPH DESCRIPTION GENERATING METHOD AND APPARATUS, MEDIUM AND ELECTRONIC DEVICE

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventors: Yingwei Pan, Beijing (CN); Ting Yao, Beijing (CN); Tao Mei, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 376 days.

(21) Appl. No.: 17/626,171

(22) PCT Filed: Mar. 11, 2020

(86) PCT No.: PCT/CN2020/078837
§ 371 (c)(1),
(2) Date: Jan. 11, 2022

(87) PCT Pub. No.: WO2021/008145
PCT Pub. Date: Jan. 21, 2021

(65) Prior Publication Data
US 2022/0270359 A1    Aug. 25, 2022

(30) Foreign Application Priority Data
Jul. 12, 2019  (CN) .......................... 201910629398.8

(51) Int. Cl.
G06V 10/82    (2022.01)
G06N 3/08     (2023.01)
(Continued)

(52) U.S. Cl.
CPC ............... *G06V 10/82* (2022.01); *G06N 3/08* (2013.01); *G06V 10/40* (2022.01); *G06V 10/771* (2022.01); *G06V 10/776* (2022.01); *G06V 10/80* (2022.01)

(58) Field of Classification Search
CPC ........ G06V 10/40; G06V 10/80; G06V 10/82; G06V 10/771; G06V 10/776; G06N 3/08
See application file for complete search history.

(56) References Cited

U.S. PATENT DOCUMENTS 11,087,864 B2 *   8/2021   Xie ..................... H04L 67/104
2017/0011063 A1   1/2017   Lee et al.
(Continued)

FOREIGN PATENT DOCUMENTS

CN    106650756 A    5/2017
CN    106846306 A    6/2017
(Continued)

OTHER PUBLICATIONS

Diverse and Coherent Paragraph Generation from Images. (Year: 2018).*

(Continued)

*Primary Examiner* — Daniel G Mariam
(74) *Attorney, Agent, or Firm* — Qinghong Xu

(57) ABSTRACT

An image paragraph description generating method and apparatus, a medium and an electronic device. The method comprises: obtaining image features of an image (S101); determining the topic of the image according to the image features by using a convolutional automatic coding method (S102); and determining image description information of the image according to the topic by using a long short-term memory (LSTM)-based paragraph coding method (S103), wherein the LSTM comprises a sentence-level LSTM and a paragraph-level LSTM.

11 Claims, 5 Drawing Sheets

(51) Int. Cl.
  *G06V 10/40* (2022.01)
  *G06V 10/771* (2022.01)
  *G06V 10/776* (2022.01)
  *G06V 10/80* (2022.01)

(56) References Cited

U.S. PATENT DOCUMENTS

2018/0337994 A1    11/2018  Dachille et al.
2019/0066663 A1     2/2019  Kotri et al.
2020/0110607 A1*    4/2020  Croxford ............ G06F 9/30101

FOREIGN PATENT DOCUMENTS

| CN | 107391609 A | 11/2017 |
| CN | 108416065 A | 8/2018 |
| CN | 108898639 A | 11/2018 |
| CN | 109697239 A | 4/2019 |

OTHER PUBLICATIONS

The International Search Report dated May 28, 2020 for PCT international application No. PCT/CN2020/078837.
1st Office Action dated Jun. 9, 2023 of Chinese Application No. 201910629398.8.
Lu Iing, Yang Wu, Wang Yuanlun,etc. "Long text classification combined with attention mechanism", Jan. 9, 2018.

* cited by examiner

IMAGE PARAGRAPH DESCRIPTION GENERATING METHOD AND APPARATUS, MEDIUM AND ELECTRONIC DEVICE

CROSS-REFERENCE TO RELATED APPLICATION

The present application is the 371 application of PCT Application No. PCT/CN2020/078837, filed on Mar. 11, 2020, the content of which is incorporated hereby in its entirety for all purposes.

TECHNICAL FIELD

The present disclosure relates to the technical field of image processing, and in particular to an image paragraph description generating method, apparatus, medium and electronic device.

BACKGROUND

In the field of image processing technology, neural network technology is widely used to describe every detail in an image to generate a coherent story describing visual content of the image. There are following two main problems in the description of images: 1) How to extract a main idea or a topic worth describing from the image? 2) How to describe each topic using one sentence while ensuring the coherence between sentences to form a paragraph?

In related technologies, the description of the image relies on Recurrent Neural Networks (RNN), for example, Long Short-Term Memory (LSTM). Specifically, regional features of the image are encoded into a global vector through an average fusion, and then are input into the LSTM to decode, and then obtain the topic. In this case, the inherent structure between all image regions is not fully utilized, making it difficult to fully describe the topic in the image. In addition, some image description methods use hierarchical RNNs to process the input regional features, thereby generating paragraphs describing images, wherein the hierarchical RNNs include sentence RNNs and word RNNs. Specifically, the sentence RNNs recursively generate sentence topic vectors conditioned on the global vector (that is, an average combination of regional features), and then use the word RNNs to decode each topic into an output sentence.

However, the image description method in the prior art does not make full use of the details in the image and the relationship between the image regions, and in addition, the generated image description sentences lack continuity.

It should be noted that the information of the disclosure in the background art section above is only used to enhance the understanding of the background of the disclosure, and therefore may include information that does not constitute the prior art known to those of ordinary skill in the art.

SUMMARY

According to one aspect of the present disclosure, there is provided an image paragraph description generating method. The image paragraph description generating method may include: acquiring image features of an image: determining a topic of the image according to the image features by using a convolutional automatic encoding method; and determining image description information of the image according to the topic by using a long short-term memory (LSTM)-based paragraph encoding method: wherein the LSTM comprises a sentence-level LSTM and a paragraph-level LSTM.

According to a second aspect of the disclosure, there is provided a computer-readable storage medium with a computer program stored thereon, wherein when the computer program is executed by a processor, the processor implements steps in the image paragraph description generating method according to any one of embodiments.

According to a third aspect of the disclosure, there is provided an electronic device. The electronic device may include: one or more processor and memory for storing one or more programs, and when the one or more programs are executed by the one or more processors, the one or more processors implement the image paragraph description generating method according to any one of embodiments.

It should be understood that the above general description and the following detailed description are only exemplary and explanatory, and cannot limit the present disclosure.

BRIEF DESCRIPTION OF THE DRAWINGS

The drawings here are incorporated into the specification and constitute a part of the specification, show embodiments in accordance with the present disclosure and together with the specification are used to explain the principle of the present disclosure. Obviously, the drawings in the following description are only some embodiments of the present disclosure. For those of ordinary skill in the art, other drawings can be obtained based on these drawings without creative work.

DETAILED DESCRIPTION

Figure 1:
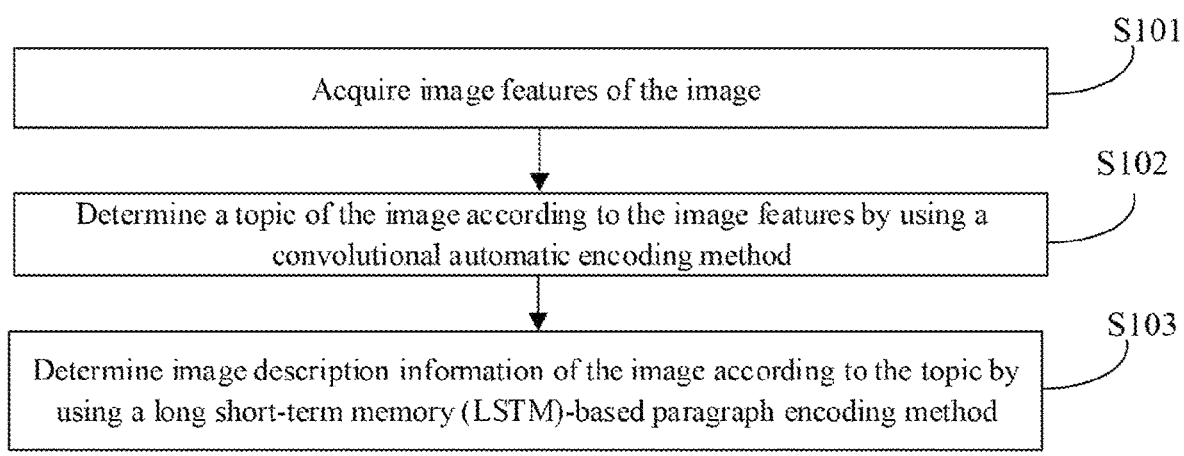
FIG. 1 shows a schematic flowchart of an image paragraph description generating method according to some embodiments of the present disclosure.

Example embodiments will now be described more fully with reference to the accompanying drawings. However, the example embodiments can be implemented in various forms, and should not be construed as being limited to the examples set forth herein; on the contrary, the provision of these embodiments makes the present disclosure more comprehensive and complete, and fully conveys the concept of the example embodiments to those skilled in the art.

In addition, the described features, structures, or characteristics may be combined in one or more embodiments in any suitable manner. In the following description, many specific details are provided to give a full understanding of the embodiments of the present disclosure. However, those skilled in the art will realize that the technical solutions of the present disclosure can be practiced without one or more of the specific details, or other methods, components, devices, steps, etc. can be used. In other cases, well-known methods, devices, implementations or operations are not shown or described in detail to avoid obscuring aspects of the present disclosure.

The block diagrams shown in the drawings are merely functional entities, and do not necessarily correspond to physically independent entities. That is, these functional entities can be implemented in the form of software, or implemented in one or more hardware modules or integrated circuits, or implemented in different networks and/or processor devices and/or microcontroller devices.

The flowchart shown in the drawings is only an exemplary description, and does not necessarily include all contents and operations/steps, nor does it have to be performed in the described order. For example, some operations/steps can be decomposed, and some operations/steps can be combined or partially combined, so the actual execution order may be changed according to actual conditions.

The inventors of the present disclosure have discovered that image in real life often contain multiple, diverse and descriptive topics, making this problem very challenging. A key issue is how to extract these main ideas or topics worth describing from the image and generate a unified description having multiple topics based on these main ideas or topics. Inspired by generating adversarial networks, some image description methods extend hierarchical RNNs by using multi-stage adversarial discriminators for generating paragraphs. Therefore, paragraphs describing the image are generated to produce real paragraphs with smooth logical transitions between sentence topics. In addition, formulas about coherence vectors, global topic vectors, and variational auto-encoding are adopted to enhance hierarchical RNNs to further simulate inherent ambiguity of associating paragraphs with images. However, the image description method in the prior art does not make full use of the details in the image and relationships between the image regions, and the generated image description sentences lack continuity mutually.

The image paragraph description generating method according to the present disclosure combines the convolutional automatic encoding method and the long short-term memory (LSTM) and utilizes the learned topic to assist the paragraph generation. CAE-LSTM adopts a paragraph generation framework based on two-layer LSTM (i.e., the paragraph level LSTM and the sentence level LSTM), and combines the attention mechanism. The paragraph-level LSTM is used to capture dependencies between sentences in paragraphs, and the sentence-level LSTM generates sentences based on a specific learned topic.

The image paragraph description generating method according to the present disclosure can producing a coherent paragraph that describes the visual content of an image, which can solve the problem that it is hard to have an accurate description when there are multiple descriptive and diverse gists to be considered for paragraph generation, which often happens in real images. Related technologies have not addressed how to encapsulate such gists/topics that are worthy of mention from an image, and then describe the image from one topic to another but holistically with a coherent structure. The image paragraph description generating method according to the present disclosure present a new design, that is, Convolutional Auto-Encoding (CAE), which purely employs convolutional and de-convolutional auto-encoding framework for topic modeling on the region-level features of an image. Further, the architecture of CAE plus Long Short-Term Memory integrates the learnt topics in support of paragraph generation. Technically, CAE-LSTM capitalizes on a two-level LSTM-based paragraph generation framework with attention mechanism. The paragraph-level LSTM captures the inter-sentence dependency in a paragraph, while sentence-level LSTM is to generate one sentence which is conditioned on each learnt topic.

The image paragraph description generating method according to the present disclosure uses Convolutional Auto-Encoding (CAE) structure to model the topics of an image. CAE, on one hand, abstracts the topics in the encoder by employing convolutions over the region-level features, and on the other, steers the de-convolutional decoder through reconstruction from topics to features. As such, the learnt topics are potentially more representative and contain the information needed. Furthermore, The image paragraph description generating method according to the present disclosure uses a two-level LSTM-based paragraph generation framework, in which paragraph-level LSTM models the dependency holistically across all the sentences in a paragraph and sentence-level LSTM generates words in sequence conditioning on each learnt topic.

FIG. 1 shows a schematic flowchart of an image paragraph description generating method in some embodiments of the present disclosure. The method for generating the image paragraph description may include following steps.

In a step S101, image features of an image are acquired, wherein the image features includes initial regional features of the image.

In one embodiment, a faster Recurrent-Convolutional Neural Network (R-CNN) method is used to capture image features of the image.

In some embodiments, a Recurrent Neural Networks (RNN) method may also be used to obtain image features of the image, and the present disclosure is not limited to this.

In a step S102, a topic of the image is determined according to the image features using a convolutional automatic coding method.

In one embodiment, a convolutional auto-encoding method (CAE) is used to convolve the initial regional features to abstract the topic. In addition, a de-convolutional decoding is performed by a high-quality reconstruction from the topic to the initial regional features. Therefore, the obtained topic may be more representative and contain the required information.

In a step S103, image description information of the image is determined based on the topic using a Long Short-Term Memory-based (LSTM-based) paragraph coding method. Among them, the LSTM includes a sentence-level LSTM and a paragraph-level LSTM.

In one embodiment, the paragraph-level LSTM performs overall dependency modeling on all sentences in the paragraph, and the sentence-level LSTM determines a sentence generation condition and words in it based on each topic.

In the image paragraph description generating method according to the foregoing embodiment, the main idea/topic used for generating the paragraph is coded by the LSTM-based paragraph encoding method, and the main idea/topic on the initial regional feature is modeled by using convolution and de-convolution automatic coding. This design not only abstracts the topic by using the inherent structure between all regions, but also performs the de-convolution decoding through the reconstruction to achieve a more representative and informative topic. The LSTM-based paragraph coding method is used to determine the image description information of the image. The foregoing image paragraph description generating method can generate consecutive paragraphs to accurately depict the image.

The image paragraph description generating method according to the foregoing embodiment firstly implements the faster R-CNN to detect a set of salient image regions. For this, the convolutions are performed over all the region-level features in the encoder to distill the knowledge and extract the topics in the image. The learnt topics are ensured to capture holistic and representative information through achieving high reconstruction quality by the de-convolutional decoder. After that, all the region-level features are fused via mean pooling to generate image representation, which is fed into a two-level LSTM networks for paragraph generation. The paragraph-level LSTM typically explores the dependency recursively throughout the procedure of paragraph generation and outputs a new initial state at a time for sentence-level LSTM with the paragraph history. As such, the generation of one sentence is affected by semantic context from the previous sentences when producing the paragraph. The sentence-level LSTM generates the sentence conditioning on each learnt topic, one word at each time step.

Figure 2:
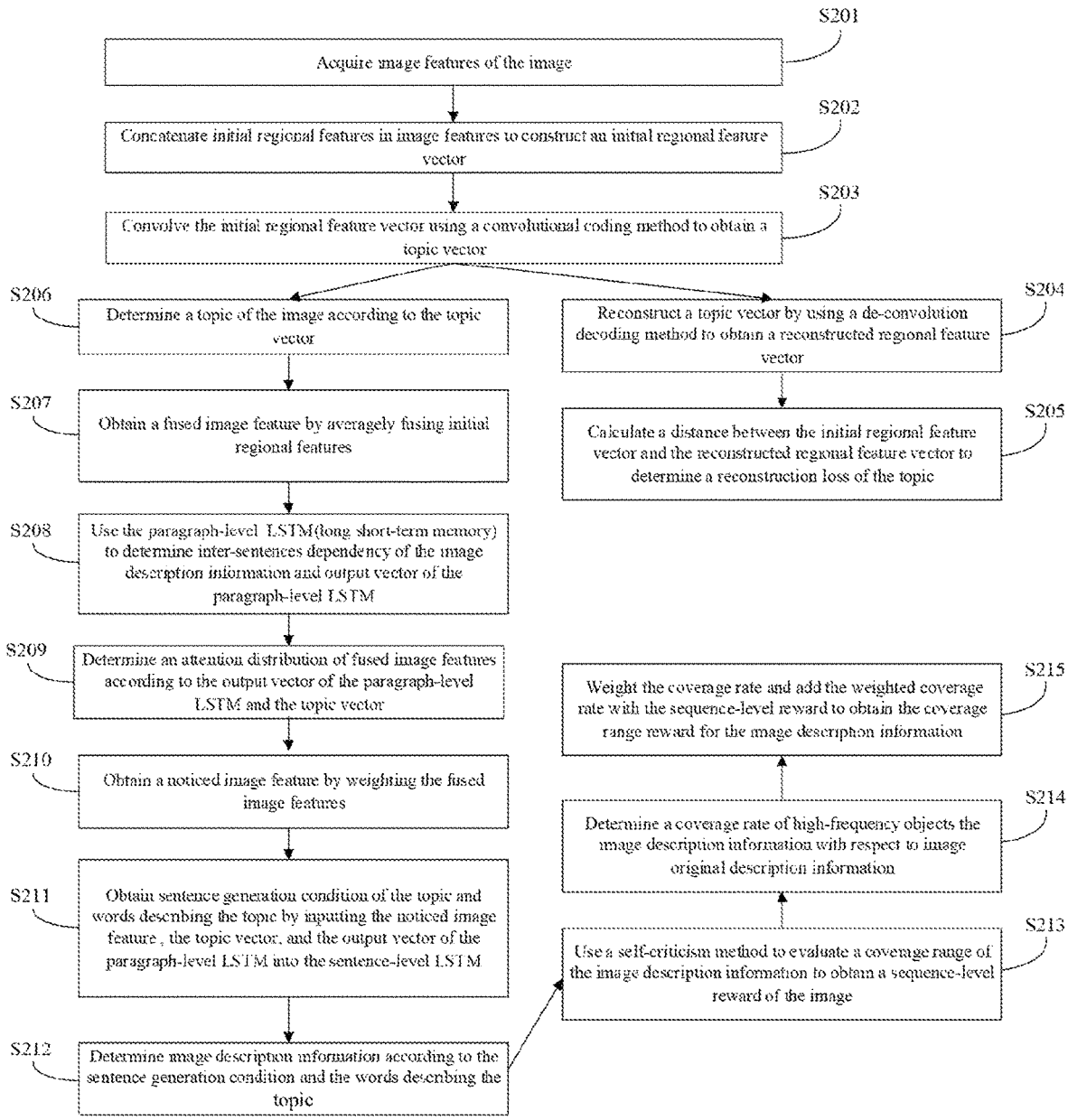
FIG. 2 shows a schematic flowchart of an image paragraph description generating method according to some embodiments of the present disclosure.

FIG. 2 shows a schematic flowchart of an image paragraph description generating method according to some embodiments of the present disclosure.

In this embodiment, an image I is described by a paragraph P and the paragraph P is composed of K sentences, that is, $P=\{s_k\}_{k=1}^{K}$. Each sentence $s_k$ is composed of $T_k$ words, that is, $s_k \gamma \{w_{(k,t)}\}_{t=1}^{T_k}$. Each word $w_{(k,t)}$ represents a $D_s$-dimensional text feature, i.e., $W_{(k,t)}$. A set of detected objects $v=\{r_m\}_{m=1}^{M}$ with M image regions in I is firstly generated using a faster Recurrent-Convolutional Neural Network (R-CNN) method. $v_m^0 \in \mathbb{R}^{D_0}$ denotes the $D_0$-dimensional feature of each image region $r_m$.

In a step S201, image features of an image are acquired, wherein the image features includes initial regional features of the image.

In a step S202, the initial regional features in the image are concatenated to construct an initial regional feature vector.

In one embodiment, each region $v_m^0$ is first embedded into the $D_1$-dimensional initial regional feature $v_m$ via a linear layer. Therefore, the initial regional feature vector $V_\in \mathbb{R}^{M \times D_1 \times 1}$ constructed by concatenating all the initial regional features (that is, v" is the m-th column of the initial regional feature vector V), and are set as the input of convolutional coder. Herein, M, $D_1$ and 11 respectively represent a width, a height and the number of channels of the initial regional feature vector V.

In a step S203, a topic vector is obtained by convolving the initial regional feature vector using a convolutional coding method.

In one embodiment, a set of detected regions $v=\{r_m\}_{m=1}^{M}$ is given, and all image regions are encapsulated into K topic vectors using a convolutional coding method. The above method is only applied in the convolution process. Specifically, a convolutional layer (conv) is used to encode the initial regional feature vector V into a topic feature mapping $V^S$, which is composed of topic vectors:

$$V^S = \sigma[conv(V)] \in \mathbb{R}^{1 \times D_2 \times K} \qquad (1)$$

wherein $\sigma(\cdot)$ is a nonlinear activation function. For the convolutional layer (conv), a size of a convolution filter is set to $M \times C_1$, a stride size is set to $C_2$, and the number (No.) of the filter is K. Herein, each vector along the channel dimension in the topic feature mapping $V^S$ can be regarded as the k-th refined topic vector $v_k^s \in \mathbb{R}^{D_0}$.

In a step S204, a topic vector is reconstructed by using a de-convolution decoding method to obtain a reconstructed regional feature vector.

In one embodiment, a de-convolution layer (deconv) (that is, conjugate operation of convolution) is used to decode the refined topic vectors in the topic feature mapping $V^S$ to obtain the reconstructed regional feature vector, that is back to the regional feature vectors. In particular, given the topic feature mapping $V^S$, the de-convolution is used to reproduce the reconstructed regional feature vector $\tilde{V}$:

$$\tilde{V} = deconv(V^S) \in \mathbb{R}^{M \times D_1 \times 1} \qquad (2)$$

The filter size and the stride size in the de-convolution layer (deconv) are set to be the same as that of the convolutional layer (conv). Herein, the m-th column of the reconstructed regional feature vector $\tilde{V}$ corresponds to the reconstructed regional feature of the m-th image region.

In a step S205, a distance between the initial regional feature vector and the reconstructed regional feature vector is calculated to determine a reconstruction loss of the topic, in order to measure the quality of reconstruction for the convolutional automatic coding method (CAE)

In one embodiment, a global reconstruction loss is defined as a distance $L_1$ between the initial regional feature vector V and the reconstructed regional feature $\tilde{V}$:

$$L_{rec}(\tilde{V}, V) = \|\tilde{V} - V\|_1 \qquad (3)$$

By minimizing the reconstruction loss, refining the topic vectors is enforced to capture overall and representative information from all regions by achieving higher reconstruction quality.

In a step S206, a topic of the image is determined according to the topic vector.

In one embodiment, the topic vector can also be used to determine the number of generated sentences. Specifically, each topic vector is additionally injected into a linear layer to obtain a distribution over two states {CONTINUE=0, STOP=1}, so as to determine whether the sentence is the last sentence in the paragraph.

In a step S207, a fused image feature is obtained by averagely fusing the initial regional features.

In one embodiment, the initial regional features are averagely fused through an average pool, which is also called as mean pool, and the fused image feature is $$\overline{V} = \frac{1}{M} \sum_{m=1}^{M} V_m.$$

In a step S208, the paragraph-level LSTM is used to determine an inter-sentence dependency of the image description information and an output vector of the paragraph-level LSTM.

In one embodiment, for each time step t used to generate the k-th sentence in a paragraph, an input vector $X_{(k,t)}^P$ the paragraph-level LSTM is defined as the concatenation of the previous output of sentence LSTM $h_{(k,t-1)}^s \in \mathbb{R}^H$, the averagely fused image feature $$\overline{V} = \frac{1}{M} \sum_{m=1}^{M} V_m$$

and embedding of previously generated words $W_{(k,t-1)}$:

$$X_{(k,t)}^P = [h_{(k,t-1)}^s, \overline{V}, W_S w_{(k,t-1)}] \qquad (4)$$

wherein, $W_S$ is a transformation matrix of the input word. This input vector $X_{(k,t)}^P$ collects maximum context information for the paragraph-level LSTM to simulate inter-sentence dependency. The output vector of the paragraph-level LSTM is $h_{(k,t-1)}^s \in \mathbb{R}^H$.

In a step S209, an attention distribution of fused image features is determined according to the output vector of the paragraph-level LSTM and a corresponding topic vector.

In one embodiment, given the output vector $h_{(k,t)}^p \in \mathbb{R}^H$ of the paragraph-level LSTM and the corresponding topic vector $v_k^s \in \mathbb{R}^{D_2}$, a normalized attention distribution over all fused image features is measured as:

$$a_{(k,t)}^m = W_{att}[\tanh(W_v v_m + W_h h_{(k,t)}^p + W_t v_k^s)]$$

$$\alpha_{(k,t)} = \text{soft max}(a_{(k,t)}) \quad (5)$$

wherein, $a_{(k,t)}^m$ is a m-th element of $a_{(k,t)}$, and $W_{att} \in \mathbb{R}^{1 \times D_3}$, $W_v \in \mathbb{R}^{D_3 \times D_1}$, $W_h \in \mathbb{R}^{D_3 \times H}$, $W_T \in \mathbb{R}^{D_3 \times D_2}$ are transformation matrices respectively. The m-th element $a_{(k,t)}^m$ of the attention distribution $\alpha_{k,t}$ represents the probability of $V_m$ being noticed.

In a step S210, a noticed image feature is obtained by weighting the fused image features.

In one embodiment, the noticed image feature $\hat{v}_{(k,t)} = \sum_{m=1}^{M} a_{(k,t)}^m v_m$ is calculated by aggregating all fused image features weighted with the attention.

In a step S211, a sentence generation condition of the topic and words describing the topic are obtained by inputting the noticed image feature $\hat{v}_{(k,t)} = \sum_{m=1}^{M} a_{(k,t)}^m v_m$, the corresponding topic vector $v_k^s$, and the output vector $h_{(k,t)}^p$ of the paragraph-level LSTM into the sentence-level LSTM.

In one embodiment, the concatenation of the noticed image feature $\hat{v}_{(k,t)}$ and the corresponding topic vector $v_k^s$ and the output vector of the paragraph-level LSTM $h_{(k,t)}^p$ is used as an input $x_{(k,t)}^s$ of the sentence-level LSTM for generating the topic-oriented sentence:

$$x_{(k,t)}^s = [\hat{v}_{(k,t)}, v_k^s, h_{(k,t)}^p] \quad (6)$$

The output vector $h_{(k,t)}^s$ of sentence-level LSTM is used to predict a next word $w_{(k,t)}$ by feeding into a soft-max layer.

In a step S212, the image description information is determined according to the sentence generation condition and the words describing the topic, wherein a time step t corresponds to one word.

In a step S213, a self-criticism method is used to evaluate a coverage range of the image description information to obtain a sequence-level (CIDEr) reward of the image.

In a step S214, a coverage rate of high-frequency objects the image description information relative to ground-truth paragraph information is determined. The top-1 n frequent objects from the vocabulary in the training data are selected as the high-frequency objects and the ground-truth paragraph information is information about real paragraph.

In one embodiment, a coverage range reward is defined as a coverage rate of high-frequency objects in the generated image description paragraph relative to the ground-truth paragraph, that is, $$R^c = \frac{|Q_g \cap Q_{gt}|}{|Q_{gt}|}.$$

Among them, |•| represents the number of elements in the set. Here, $Q_{gt}$ and $Q_g$ represent the set of high-frequency objects mentioned in the generated image description paragraph and the ground-truth paragraph respectively.

In a step S215, the coverage rate is weighted and is added to the sequence-level reward to obtain a final reward for the image description information, which can encourage the objects in this paragraph to perform a global coverage, thus achieving self-criticism training.

In one embodiment, the final reward of the self-criticism method is a combination of sequence-level reward ($R^d$) and the coverage range reward ($R^c$): $R = \beta R^c + R^d$, wherein $\beta$ is a weighted parameter.

The image paragraph description generating method in the above embodiment uses the LSTM-based paragraph encoding method to recursively code the main idea/topic for generating the paragraph, and uses the convolution and de-convolution automatic encoding method to model the main idea/topic on the initial regional features. This design not only abstracts the topic by using the inherent structure between all regions, but also performs de-convolution decoding through reconstruction to achieve a more representative and informative topic. In addition, the coverage range reward is adopted in the self-criticism training strategy to encourage performing the global coverage to the objects in the paragraph. The LSTM-based paragraph encoding method is used to determine the image description information of the image, and topic-oriented sentences are generated through paragraph-level LSTM and sentence-level LSTM, and inter-sentence dependency modeling is realized for paragraphs. The maximum coverage range of high-frequency objects in the paragraph is encouraged through the sequence-level award and the coverage range award. The image paragraph description generating method above can generate coherent paragraphs to accurately depict the image.

Figure 3:
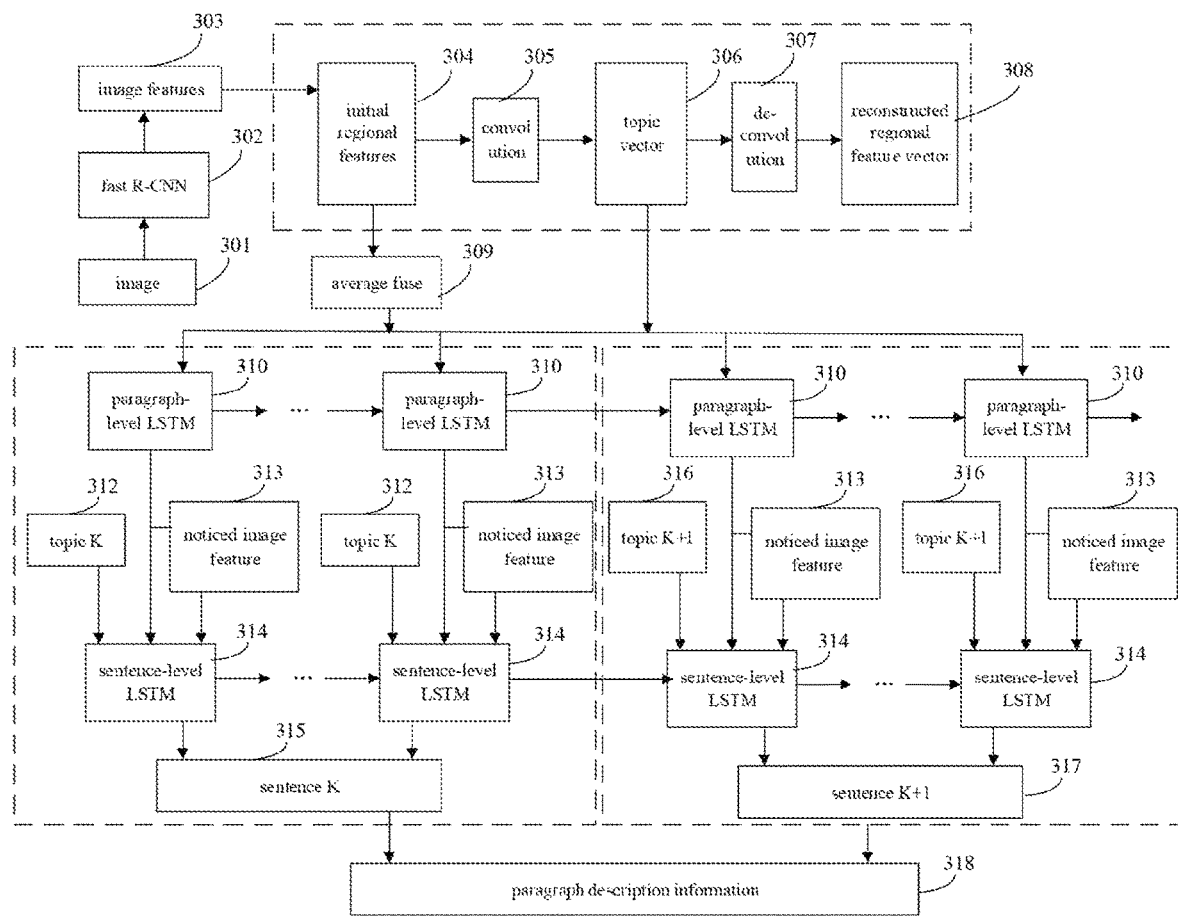
FIG. 3 shows a schematic diagram of an execution process of an image paragraph description generating method according to some embodiments of the present disclosure.

FIG. 3 shows a schematic diagram of the execution process of an image paragraph description generating method according to some embodiments of the present disclosure.

As shown in FIG. 3, the faster R-CNN 302 detects image features 303 of the image 301, and the initial regional features 304 in the image feature 303 is first processed by convolution 305 to trigger modeling of the topic in the image. The convolutional coding method is used to refine knowledge from the initial regional features 304 and extract the topic vector 306. Next, the de-convolution 307 encoding method is used to reproduce the topic vector, and obtain the reconstructed regional features 308. Furthermore, the reconstruction loss of the topic can be determined according to the reconstruction regional features 308 and the initial regional features 304. The above processing can ensure that the refined topic can capture the overall and representative information worth describing in all image regions. After that, all the initial region-level features 304 are treated as image features by using the average fusion method 309, and are treated as the input of the paragraph-level LSTM 310. Herein, recursive methods are usually used to explore inter-sentence dependencies in paragraphs. According to the output vector of the paragraph-level LSTM 310 and the topic vector K 312, the noticed image feature 313 is determined. The noticed image feature 313, topic vector K 312, and the output vector of the paragraph-level LSTM 310 are inputted into sentence-level LSTM 314 and then the sentence-level LSTM 314 generates the sentence condition and words describing the topic on each learned topic, thereby obtaining the sentence K 315 describing the topic. According to the same method, the sentence K+1 317 is obtained according to the topic K+1 316, and the corresponding sentence of each topic is finally obtained, and the image description information 318 is obtained after integrating them. In addition, sequence-level awards and coverage range awards are used to encourage the maximum coverage range of high-frequency objects in the paragraph. The above image paragraph description generating method can generate coherent paragraphs to accurately depict the image.

In one embodiment, the image paragraph description generating method proposed by the present disclosure is applied to the Stanford image paragraph data set, and the effect of the image paragraph description generating method has been verified. The Stanford image paragraph data set contains 19,551 images, and each image has a paragraph with manual annotations. On average, each paragraph has 67.5 words, and each sentence consists of 11.91 words. Among them, 14,575 images were used for training, 2,487 images were used for verification, and 2,489 images were used for testing. The performance of the image paragraph description generating method (CAE-LSTM) proposed by the present disclosure is compared with other methods on the Stanford image paragraph data set. The used other methods are, for example, Image-Flat method, Regions-Hierarchical method, RTT-GAN method, CapG-RevG method and LSTM-ATT method. The Image-Flat method is a standard image subtitle model, which directly decodes the image into a paragraph through a single LSTM. The Regions-Hierarchical method uses hierarchical LSTM to generate paragraphs sentence by sentence. The RTT-GAN method combines the adversarial training strategy to integrate sentence attention and word attention into the hierarchical LSTM. The CapG-RevG method uses coherence vectors/global topic vectors to generate coherent paragraphs, and maintains the diversity of paragraphs through variable auto-encoder formulas. The LSTM-ATT method uses LSTM (rather than CAE) to model the topic, and uses the same two-level LSTM architecture to generate the topic by using attention paragraphs, which can be trained without self-criticism training strategies. Three commonly used evaluation indicators are used: METEOR, CIDEr and BLEU-4.

For each image, the faster R-CNN is used to detect objects within the image, and select the top M=50 regions with the highest detection confidence to represent the image. Each region is represented as the 4,096-dimensional output of the fc7 layer after RoI collection from the conv5-3 feature map of faster R-CNN. Faster R-CNN is pre-trained on Visual Genome. In order to build a vocabulary, all words in the training set are converted to lowercase, and words that appear less than 4 times are omitted. Each word is represented as a 'one-hot' vector, which is a binary index vector in the vocabulary. The maximum number of sentences K is 6, and the maximum number of words in a sentence is 20 (fill in if necessary). For convolutional encoding method according to the present disclosure, the convolution filter size in the convolutional layer is set to $C_1=26$, and the stride size $C_2=2$. The dimensions of the input initial regional features and the refined topic vector are set to $C_1=1,024$ and $C_2=500$. For paragraph-level and sentence-level LSTM networks, the dimensions of the hidden states in each LSTM is H=1,000. The size of the hidden layer used to measure the attention distribution is $C_3=512$.

Two short sentence training methods are used to train the image paragraph description generating method according to the present disclosure. For the first short sentence, the learning rate is set as $1\times10^{-4}$, so the training of the image paragraph description generating method of the present disclosure is executed by combining the reconstruction loss in the convolutional coding method and the cross-entropy loss in the paragraph-level and sentence-level LSTM generators. Here, the model is evaluated in each period of the validation set, and select the model with the best CIDEr score as the initialization of the next training short sentence. For the second short sentence of training, the learning rate is set to $5\times10^{-6}$ and the image paragraph description generating method is further optimized by the combination of CIDEr rewards and coverage range rewards. In the reasoning process, the reasoning constraint is used to deal with the triple repetition. The weighting parameter is set to 8 according to the verification performance. The order of the regions is determined according to the objective score of each image region. All regions are sorted based on the confidence score of the bounding box. Alternatively, a fixed random order is simply used to study the order of the regions. When different concatenated orders of regions are used in the image paragraph description generating method of the present disclosure, the CIDEr score kept fluctuating within 0.008. The results show that the performance of the image paragraph description generating method proposed by the present disclosure is not sensitive to the choice of the order of the regions.

TABLE 1

| Method | CIDEr | METEOR | BLEU-4 |
|---|---|---|---|
| Image-Flat | 11.06 | 12.82 | 7.71 |
| Regions-Hierachical | 13.52 | 15.59 | 8.69 |
| RTT-GAN | 20.36 | 18.39 | 9.21 |
| CapG-RevG | 20.93 | 18.62 | 9.43 |
| LSTM-ATT | 20.17 | 17.72 | 8.72 |
| CAE-LSTM | 25.25 | 18.82 | 9.67 |

The Table 1 above shows the performance comparison of the image paragraph description generating method (CAE-LSTM) of the embodiment of the present disclosure and other methods on the Stanford image paragraph data set.

With reference to the results in Table 1, the image paragraph description generating method (CAE-LSTM) proposed in the present disclosure has better performance for image description. Specifically, the scores of CIDEr, METEOR and BLEU-4 of the CAE-LSTM proposed in the present disclosure are reached 25.25%, 18.82% and 9.67% respectively. Based on the scores of the above three aspects, the image paragraph description generating method proposed in the present disclosure is better than the other methods in Table 1.

Judging from the output results of all the methods in Table 1, the paragraphs generated by the image paragraph description generating method proposed in the present disclosure describe the topic in the image more accurately, coherently and diversified.

Six evaluators were invited to randomly select 1,000 images from the manual evaluation test image set. Show all evaluators a paragraph generated by different methods or manual annotations, and ask them: Can you determine whether a given paragraph is generated by the system or by humans? According to the evaluator's answer, the result is that the paragraph is generated by Human. Furthermore, after conducting Turing Test used for evaluating the CAE-LSTM against the baseline LSTM-ATT and calculating the percentage of paragraphs that pass the Turing Test, the results of Truing Test for Human, CAE-LSTM and LSTM-ATT are 88.5%, 39.8% and 14.7% respectively. Therefore, the image paragraph description generating method proposed in the present disclosure has better image description performance.

Figure 4:
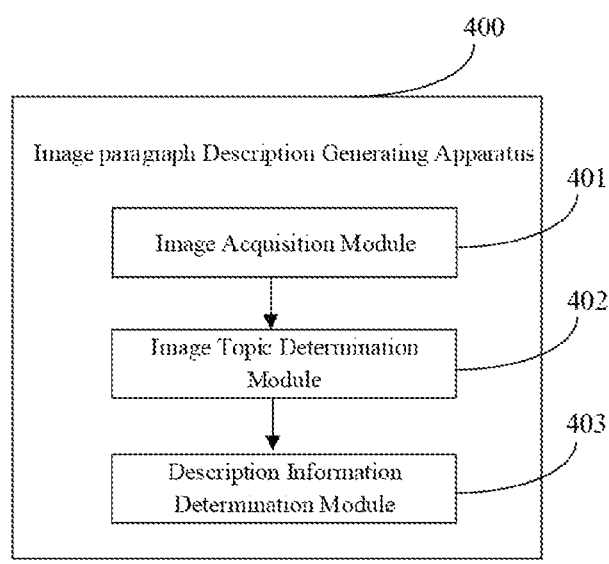
FIG. 4 shows a block diagram of an image paragraph description generating apparatus according to some embodiments of the present disclosure.

FIG. 4 shows a block diagram of an image paragraph description generating apparatus according to some embodiments of the present disclosure.

Referring to FIG. 4, the image paragraph description generating apparatus 400 includes an image acquisition module 401, an image topic determination module 402, and a description information determination module 403.

The image acquisition module 401 is configured to acquire image features of an image, wherein the image feature includes initial region features of the image.

The image topic determination module 402 is configured to determine a topic of the image according to the image features using a convolutional automatic encoding method.

In one embodiment, the topic is abstracted by convolving the initial regional features. In addition, the de-convolutional decoding is performed by high-quality reconstruction from the topic to the original regional features. Therefore, the obtained topic may be more representative and contain the required information.

The description information determining module 403 is configured to determine image description information of the image according to the topic by using a long short-term memory (LSTM)-based paragraph encoding method: wherein the LSTM comprises a sentence-level LSTM and a paragraph-level LSTM.

In one embodiment, the paragraph-level LSTM performs overall dependency modeling on all sentences in the paragraph, and the sentence-level LSTM determines the sentence generation condition and words in it based on each topic.

The image paragraph description generating apparatus in the foregoing embodiment recursively codes the main idea/topic for paragraph generation through the LSTM-based paragraph encoding method, and uses convolution and de-convolution to automatically encode to model the main idea/topic on the initial region-level features. This design of the combination of the convolutional automatic encoding method and the long short-term memory (LSTM) not only abstracts the topic by using the inherent structure between all regions, but also performs the de-convolution decoding through reconstruction to achieve a more representative and informative topic. The LSTM-based paragraph coding method is used to determine the image description information of the image. The foregoing image paragraph description generating apparatus can generate consecutive paragraphs to accurately depict an image.

Since the various functional modules of the image paragraph description generating apparatus in the exemplary embodiment of the present disclosure correspond to the steps of the foregoing example embodiment of the image paragraph description generating method, for details that are not disclosed in the apparatus embodiment of the present disclosure, refer to the embodiments of the image paragraph description generating method according to the present disclosure.

Figure 5:
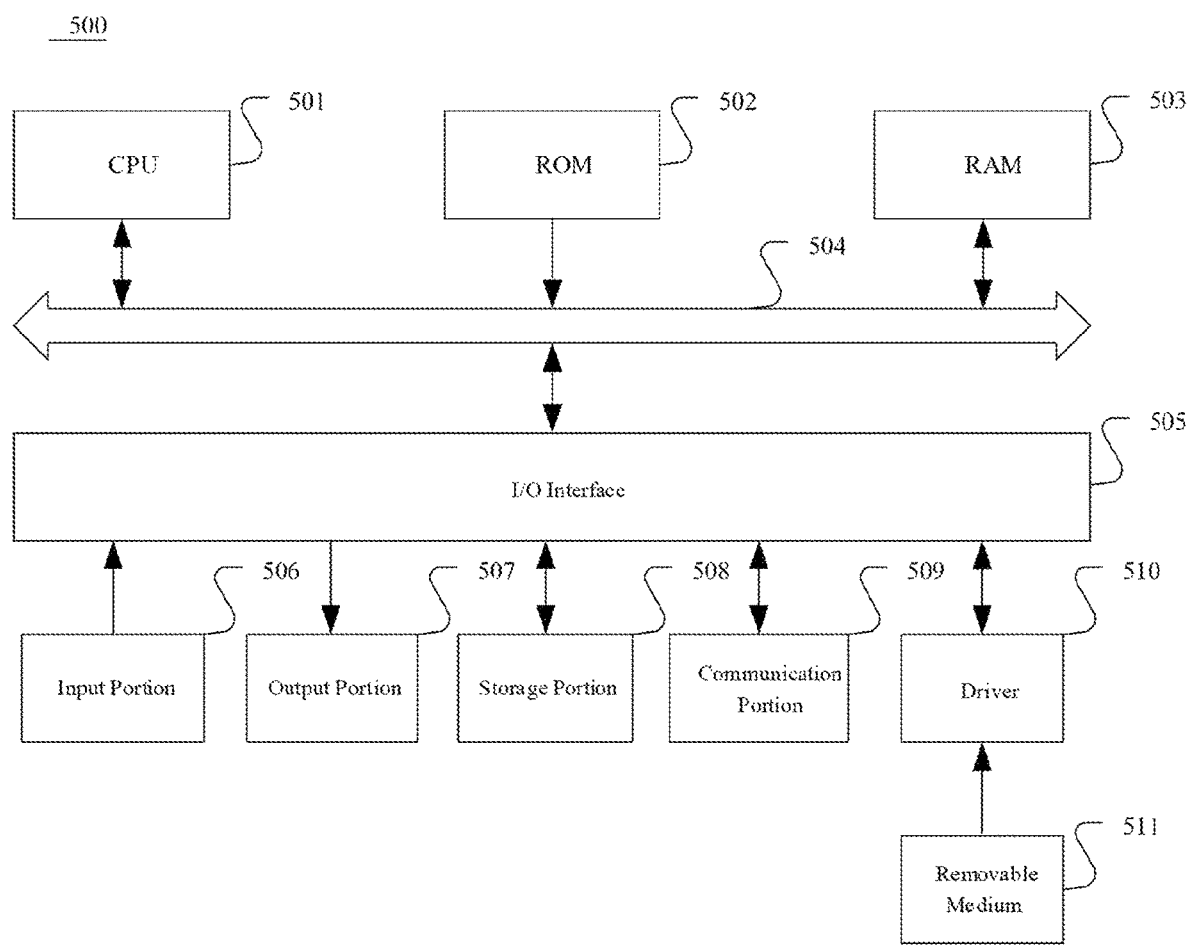
FIG. 5 shows a computer system suitable for implementing an electronic device according to some embodiments of the present disclosure.

Next, referring to FIG. 5, it shows a schematic structural diagram of a computer system 500 suitable for implementing an electronic device according to some embodiments of the present disclosure. The computer system 500 of the electronic device shown in FIG. 5 is only an example, and should not bring any limitation to the function and scope of use of the embodiment of the present disclosure.

As shown in FIG. 5, the computer system 500 includes a central processing unit (CPU) 501, which can perform various appropriate actions and processing based on a program stored in a read-only memory (ROM) 502 or a program loaded from a storage portion 508 into a random access memory (RAM) 503. In RAM 503, various programs and data required for system operation are also stored. The CPU 501, the ROM 502, and the RAM 503 are connected to each other through a bus 504. An input/output (I/O) interface 505 is also connected to the bus 504.

The following components are connected to the I/O interface 505: an input portion 506 including a keyboard, a mouse, etc.: an output portion 507 including a cathode ray tube (CRT), a liquid crystal display (LCD), etc., and speakers, etc.: a storage portion 508 including a hard disk, etc.; and a communication portion 509 including a network interface card such as a LAN card, a modem, and the like. The communication portion 509 performs communication processing via a network such as the Internet. The driver 510 is also connected to the I/O interface 505 as required. A removable medium 511, such as a magnetic disk, an optical disk, a magneto-optical disk, a semiconductor memory, etc., is installed on the driver 510 as required, so that the computer program read from removable medium 511 is installed into the storage part 508 as required.

In particular, according to an embodiment of the present disclosure, the process described above with reference to the flowchart can be implemented as a computer software program. For example, an embodiment of the present disclosure includes a computer program product, which includes a computer program carried on a computer-readable medium, and the computer program contains program code for executing the method shown in the flowchart. In such an embodiment, the computer program may be downloaded from the network through the communication portion 509 and installed, and/or downloaded from the removable medium 511 and installed. When the computer program is executed by the central processing unit (CPU) 801, it executes the above-mentioned functions defined in the system of the present disclosure.

It should be noted that the computer-readable medium shown in the present disclosure may be a computer-readable signal medium or a computer-readable storage medium, or any combination of the both. The computer-readable storage medium may be, for example, but not limited to, an electrical, magnetic, optical, electromagnetic, infrared, or semiconductor system, apparatus, or device, or a combination of any of the above. More specific examples of computer-readable storage media may include, but are not limited to: electrical connections with one or more wires, portable computer disks, hard disks, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the above. In the present disclosure, the computer-readable storage medium may be any tangible medium that contains or stores a program, and the program may be used by or in combination with an instruction execution system, apparatus, or device. In the present disclosure, a computer-readable signal medium may include a data signal propagated in a baseband or propagated as a part of a carrier wave, and a computer-readable program code is carried therein. This propagated data signal can take many forms, including but not limited to electromagnetic signals, optical signals, or any suitable combination of the foregoing. The computer-readable signal medium may also be any computer-readable medium other than the computer-readable storage medium. The computer-readable medium may send, propagate or transmit the program for use by or in combination with the instruction execution system, apparatus, or device. The program code contained on the computer-readable medium can be transmitted by any suitable medium, including but not limited to: wireless, wire, optical cable, RF, etc., or any suitable combination of the foregoing.

The flowcharts and block diagrams in the accompanying drawings illustrate possible implementation architecture, functions, and operations of the system, method, and computer program product according to various embodiments of the present disclosure. At this point, each block in the flowchart or block diagram can represent a module, program segment, or a part of code, and the above-mentioned module, program segment, or the part of code contains executable instructions for realizing the specified logic function. It should also be noted that, in some alternative implementations, the functions marked in the block may also occur in a different order from the order marked in the drawings. For example, two blocks shown one after the other can actually be executed substantially in parallel, or they can sometimes be executed in the reverse order, depending on the functions involved. It should also be noted that each block in the block diagram or flowchart, and the combination of blocks in the block diagram or flowchart can be implemented by a dedicated hardware-based system that performs the specified function or operation, or can be realized by a combination of dedicated hardware and computer instructions.

The units described in the embodiments of the present disclosure may be implemented in software or hardware, and the described units may also be provided in a processor. Among them, the names of these units do not constitute a limitation on the unit itself under certain circumstances.

As another aspect, the present disclosure also provides a computer-readable medium. The computer-readable medium may be included in the electronic device described in the above-mentioned embodiments: or it may exist alone without being assembled into the electronic device. The aforementioned computer-readable medium carries one or more programs, and when the aforementioned one or more programs are executed by an electronic device, the electronic device realizes the image paragraph description generating method described in the aforementioned embodiment.

For example, the electronic device may implement the method shown in FIG. 1. In the step S101, image features of an image are acquired. In the step S102, a topic of the image is determined according to the image features using a convolutional automatic coding method. In the step S103, image description information of the image is determined based on the topic using a Long Short-Term Memory-based (LSTM-based) paragraph coding method. Among them, the LSTM includes a sentence-level LSTM and a paragraph-level LSTM.

It should be noted that although several modules or units of the apparatus for action execution are mentioned in the above detailed description, this division is not mandatory. In fact, according to the embodiments of the present disclosure, the features and functions of two or more modules or units described above may be embodied in one module or unit. Conversely, the features and functions of a module or unit described above can be further divided into multiple modules or units to be embodied.

Through the description of the foregoing embodiments, those skilled in the art can easily understand that the exemplary embodiments described herein can be implemented by software, or can be implemented by combining software with necessary hardware. Therefore, the technical solution according to the embodiments of the present disclosure can be embodied in the form of a software product, which can be stored in a non-volatile storage medium (which can be a CD-ROM, U disk, mobile hard disk, etc.) or on the network. The software product includes several instructions to make a computing device (which can be a personal computer, a server, a touch terminal, or a network device, etc.) to execute the method according to the embodiment of the present disclosure.

The technical solutions provided by the embodiments of the present disclosure may include the following beneficial effects.

The image paragraph description generating method proposed by the present disclosure uses a convolutional automatic encoding method to determine the theme of the image, and then uses an LSTM-based paragraph encoding method to determine the image description information of the image. The above technical solution can accurately generate the image description information.

Those skilled in the art will easily think of other embodiments of the present disclosure after considering the specification and practicing the disclosure disclosed herein. This disclosure is intended to cover any variations, uses, or adaptive changes of the present disclosure. These variations, uses, or adaptive changes follow the general principles of the present disclosure and include common knowledge or conventional technical means in the technical field that are not disclosed by the present disclosure. The description and the embodiments are to be regarded as exemplary only, and the true scope and spirit of the present disclosure are pointed out by the following claims.

It should be understood that the present disclosure is not limited to the precise structure that has been described above and shown in the drawings, and various modifications and changes can be made without departing from its scope. The scope of the present disclosure is only limited by the appended claims.

What is claimed is:

1. An image paragraph description generating method, comprising:
   acquiring image features of an image;
   determining a topic of the image according to the image features by using a convolutional automatic encoding method; and
   determining image description information of the image according to the topic by using a long short-term memory (LSTM) based paragraph encoding method; wherein the LSTM comprises a sentence-level LSTM and a paragraph-level LSTM;
   wherein the image features comprise initial regional features of the image, and determining the topic of the image according to the image feature by using the convolutional automatic encoding method comprises:
   constructing an initial regional feature vector by concatenating the initial regional features;
   obtaining a topic vector by convolving the initial regional feature vector using the convolutional coding method; and
   determining the topic of the image based on the topic vector; and
   wherein the method further comprises:
   reconstructing the topic vector by using a de-convolution decoding method to obtain a reconstructed regional feature vector; and
   determining a reconstruction loss of the topic by calculating a distance between the initial regional feature vector and the reconstructed regional feature vector.

2. The method according to claim 1, further comprising: determining a number of sentences contained in the image description information according to the topic vector.

3. The method according to claim 1, further comprising: obtaining a fused image feature by averagely fusing the initial regional features.

4. The method according to claim 3, wherein the determining image description information of the image according to the topic by using the LSTM based paragraph encoding method comprises:
- determining, according to the fused image feature, an inter-sentences dependency in the image description information and an output vector of the paragraph-level LSTM using the paragraph-level LSTM;
- determining an attention distribution of the fused image feature according to the output vector of the paragraph-level LSTM and the topic vector;
- obtaining a noticed image feature by performing a weighting processing on the fused image feature based on the attention distribution;
- obtaining a sentence generation condition of the topic and words describing the topic by inputting the noticed image feature, the topic vector, and the output vector of the paragraph-level LSTM into the sentence-level LSTM; and
- determining the image description information according to the sentence generation condition and the words describing the topic.

5. The method according to claim 1, further comprising:
- obtaining a sequence-level reward of the image by evaluating a coverage range of the image description information using a self-criticism method;
- determining a coverage rate of high-frequency objects of the image description information with respect to ground-truth paragraph information; and
- obtaining a final reward for the image description information by weighting the coverage rate and then adding the weighted coverage rate with the sequence-level reward.

6. A non-transitory computer-readable medium with a computer program stored thereon, wherein the program is executed by a processor to implement an image paragraph description generating method,
wherein the image paragraph description generating method comprises:
- acquiring image features of an image;
- determining a topic of the image according to the image features by using a convolutional automatic encoding method; and
- determining image description information of the image according to the topic by using a long short-term memory (LSTM) based paragraph encoding method; wherein the LSTM comprises a sentence-level LSTM and a paragraph-level LSTM;
- wherein the image features comprise initial regional features of the image, and determining the topic of the image according to the image feature by using the convolutional automatic encoding method comprises:
- constructing an initial regional feature vector by concatenating the initial regional features;
- obtaining a topic vector by convolving the initial regional feature vector using the convolutional coding method; and
- determining the topic of the image based on the topic vector; and
wherein the method further comprises:
- reconstructing the topic vector by using a de-convolution decoding method to obtain a reconstructed regional feature vector; and
- determining a reconstruction loss of the topic by calculating a distance between the initial regional feature vector and the reconstructed regional feature vector.

7. An electronic device, comprising:
- one or more processors;
- storage device configured to store one or more programs, and when the one or more programs are executed by the one or more processors, the one or more processors are configured to:
- acquire image features of an image;
- determine a topic of the image according to the image features by using a convolutional automatic encoding method; and
- determine image description information of the image according to the topic by using a long short-term memory (LSTM) based paragraph encoding method; wherein the LSTM comprises a sentence-level LSTM and a paragraph-level LSTM;
- wherein the image features comprise initial regional features of the image, and the one or more processors are configured to:
- construct an initial regional feature vector by concatenating the initial regional features;
- obtain a topic vector by convolving the initial regional feature vector using the convolutional coding method; and
- determine the topic of the image based on the topic vector; and
- wherein the one or more processors are further configured to:
- reconstruct the topic vector by using a de-convolution decoding method to obtain a reconstructed regional feature vector; and
- determine a reconstruction loss of the topic by calculating a distance between the initial regional feature vector and the reconstructed regional feature vector.

8. The electronic device according to claim 7, wherein the processors are further configured to:
- determine a number of sentences contained in the image description information according to the topic vector.

9. The electronic device according to claim 7, wherein the processors are further configured to:
- obtain a fused image feature by averagely fusing the initial regional features.

10. The electronic device according to claim 9, wherein the processors are configured to:
- determine, according to the fused image feature, an inter-sentences dependency in the image description information and an output vector of the paragraph-level LSTM using the paragraph-level LSTM;
- determine an attention distribution of the fused image feature according to the output vector of the paragraph-level LSTM and the topic vector;
- obtain a noticed image feature by performing a weighting processing on the fused image feature based on the attention distribution;
- obtain a sentence generation condition of the topic and words describing the topic by inputting the noticed image feature, the topic vector, and the output vector of the paragraph-level LSTM into the sentence-level LSTM; and
- determine the image description information according to the sentence generation condition and the words describing the topic.

11. The electronic device according to claim 7, wherein the processors are configured to:
- obtain a sequence-level reward of the image by evaluating a coverage range of the image description information using a self-criticism method;

determine a coverage rate of high-frequency objects of the image description information with respect to ground-truth paragraph information; and obtain a final reward for the image description information by weighting the coverage rate and then adding the weighted coverage rate with the sequence-level reward.

\* \* \* \* \*